United States Patent [19]
Burke

[11] Patent Number: 4,474,172
[45] Date of Patent: Oct. 2, 1984

[54] SOLAR WATER HEATING PANEL
[75] Inventor: Ben G. Burke, Lafayette, Calif.
[73] Assignee: Chevron Research Company, San Francisco, Calif.
[21] Appl. No.: 436,396
[22] Filed: Oct. 25, 1982
[51] Int. Cl.³ .............................................. F24J 3/02
[52] U.S. Cl. ................................. 126/449; 126/418; 126/444
[58] Field of Search .............. 126/418, 439, 444, 446, 126/449, 450, 419, 434; 165/170

[56] References Cited
U.S. PATENT DOCUMENTS

| | | | |
|---|---|---|---|
| 3,502,142 | 3/1970 | McGuffey | 165/170 |
| 4,228,790 | 10/1980 | Davidson et al. | 126/444 |
| 4,357,933 | 9/1982 | Payma | 165/170 |

FOREIGN PATENT DOCUMENTS

| | | | |
|---|---|---|---|
| 257425 | 5/1963 | Australia | 126/449 |
| 2644050 | 11/1975 | Fed. Rep. of Germany | 126/444 |

Primary Examiner—James C. Yeung
Assistant Examiner—Noah P. Kamen
Attorney, Agent, or Firm—Burns, Doane, Swecker & Mathis

[57] ABSTRACT

The present invention discloses a solar water heating panel and method of constructing such a solar panel from a pair of thin sheets bonded together around their peripheral edges and having at least one of the sheets formed with resiliently flexible areas defined by a plurality of abutting concave hexagonal areas or zones. The center of each hexagonal zone is formed as a dimple, concave with respect to the opposite sheet, whose radius of curvature is greater than the radius of an inscribed circle within said zone. The abutting zones between each hexagonal zone are formed convex relative to the opposite sheet and have a radius less than that of an inscribed circle. In a preferred form, the sheets are joined together at the center of alternate spaced-apart hexagonal areas. In this way, except for the centers bonded near the panel edges, each joined hexagonal center is surrounded by six unjoined areas to form both transverse and longitudinal flow passages through the panel.

14 Claims, 7 Drawing Figures

U.S. Patent  Oct. 2, 1984  4,474,172
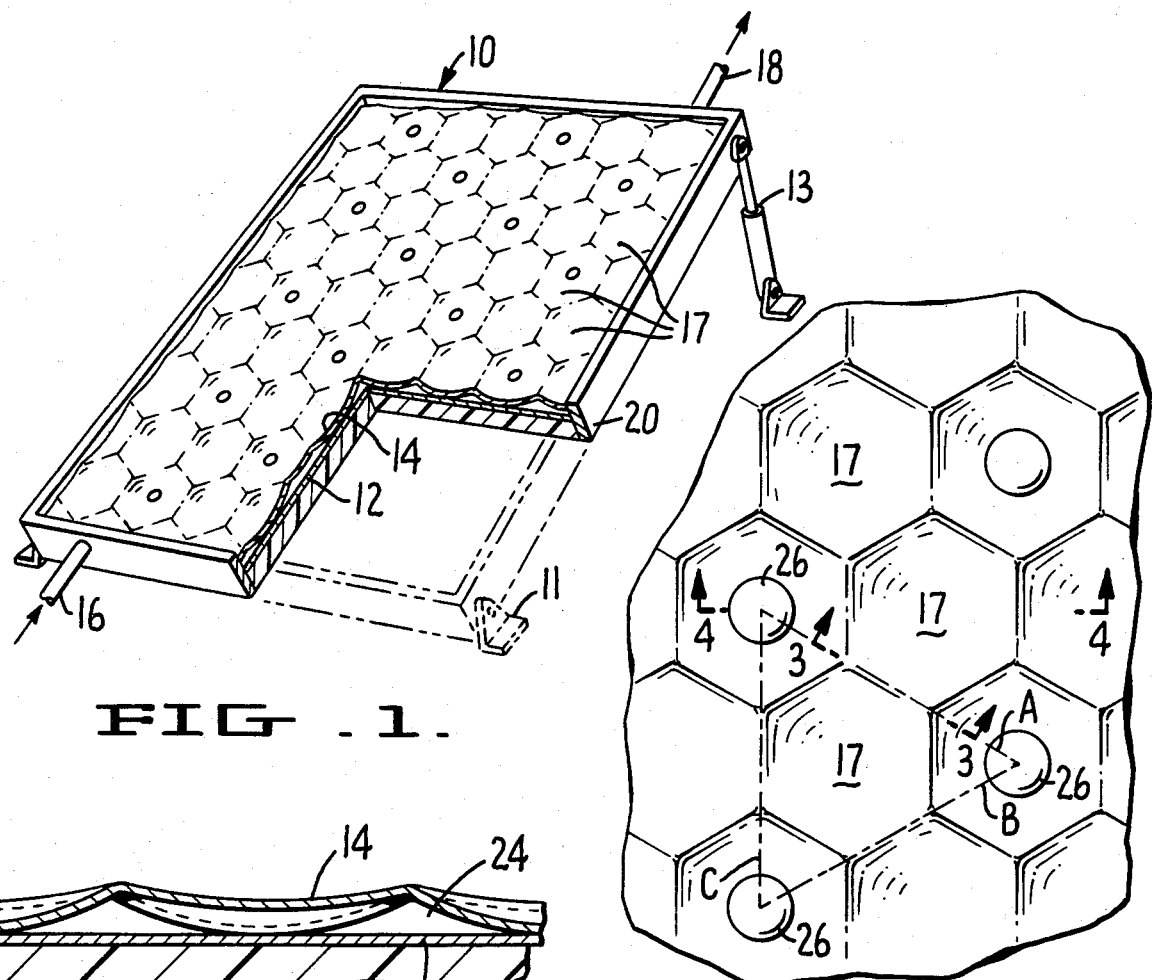
FIG. 1.
FIG. 2.
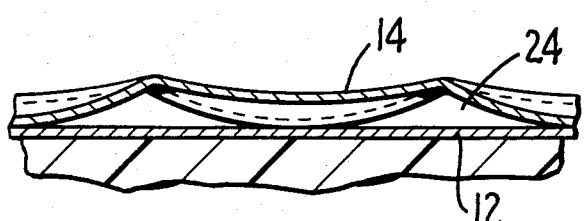
FIG. 3.
FIG. 5.  FIG. 6.
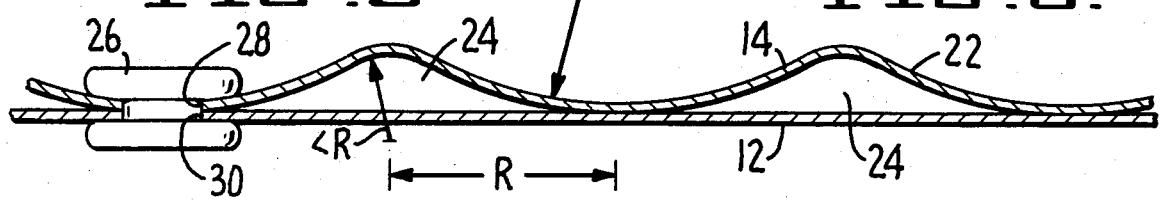
FIG. 4.
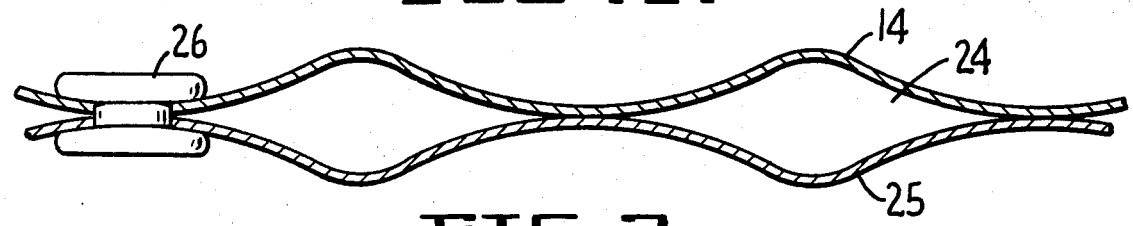
FIG. 7.

SOLAR WATER HEATING PANEL

FIELD OF THE INVENTION

The present invention relates to solar water heating panels. More particularly, it relates to a method of forming solar heating panels of two thin plates or sheets bonded together at spaced points to form a high surface area to liquid volume ratio, with sufficient flexibility to withstand cyclic thermal stresses on the panel bonds over a range of liquid temperatures from near boiling to freezing.

It is a particular object of the invention to form such a solar water heating panel having a high surface area to volume ratio of relatively thin plates of metal, rubber or thermoset plastic containing reinforcing fibers, such as glass. A high surface to volume ratio is achieved by forming at least one of the plates or sheets with uniformly distributed hexagonally dimpled areas over its principle surface. Each dimple is formed so that its center is inwardly concave toward the other sheet forming the solar panel. The radius of the concave dimple area is greater than the radius of an inscribing circle for the hexagonal dimple. The areas at the intersections of abutting hexagonal dimples are convex and have a radius smaller than the inscribing circle; they provide the major liquid flow paths both longitudinally and transversely through the panel. The two plates are secured together around their peripheral edges and in a preferred embodiment at the centers of each of the closest, non-adjacent dimples. Preferably, each dimpled area that is joined to the other plate is riveted or otherwise mechanically secured so that forces that act to separate the panel plates, due to internal pressure and thermal expansion or contraction of the material, and those imposed by freezing of liquid in the flow passageways, are resisted by a positive, tension-resistant connection. In this way, pressure forces on the plates are resisted by membrane stresses in the doubly curved concave and convex areas.

BACKGROUND OF THE INVENTION

Solar heating panels used in water heating systems are generally mounted on a roof top or other exposed position and tilted at a suitable angle to intercept maximum solar energy at the geographic location. Desirably, the panel has a large surface to liquid volume ratio so that solar energy absorbed by the panel rapidly heats a thin layer of liquid (primarily water) in the panel. In a passive system, this creates a sufficient difference in liquid density at the top and bottom of the tilted panel to create a pumping action on the liquid to circulate it back to a heat storage tank. If the liquid is water, hot water may be withdrawn directly from the storage tank. More frequently, the solar heated liquid heats the domestic water supply through a heat exchanger in the storage tank.

Pumping liquid through the panel stops when there is not enough solar energy. In cold weather, particularly at night, the liquid freezes in the panel. Such freezing blocks circulation until solar energy (or warm weather) thaws the liquid. Expansion of internal fluid during freezing imposes substantial strains in the panel. Such strains are, of course, repetitive for each freeze and thaw cycle. Where a panel is formed of parallel tubes the strains usually are concentrated at the interconnected headers. Further, to accommodate such strains, the surface area to liquid volume ratio is generally reduced which in turn reduces the overall efficiency of the solar heating system. Additionally, the cost both in labor and parts to assemble a solar panel from a plurality of parallel tubes and headers substantially reduces the economic advantages of solar water heating systems over conventional fossil fuel systems.

It has been proposed heretofore to construct such solar liquid heating panels of sheets of metal, rubber or thermoset plastic materials bonded together at discrete locations over the surface of the sheets. Such panels, in general, have not been constructed to withstand adequately repetitive freeze and thaw cycles. I have found that such failures involve breaking of the bonds between the sheets so that the panel loses dimensional stability and at the same time uniformity in thickness of the liquid layer to be heated. Liquid flow then primarily passes through any resulting "bulges" since the enlarged areas are less resistant to flow. Such channeled flow reduces the heat exchange efficiency of the panel. Where the bonds are strong enough to resist such stresses, either the sheet must be increased in thickness, thereby adding to cost, or repeated stresses may crack the material with consequent loss of liquid which requires repair or replacement of the panel.

As disclosed in U.S. patent application Ser. No. 258,304, filed June 23, 1981 by H. W. Anderson and M. E. Negly, and U.S. patent application Ser. No. 258,519, filed June 22, 1981 by B. S. Buckley, both assigned to the assignee of the present invention, a suitable panel may be formed of two or more sheets of rubber, or other elastomeric material, bonded together about their edges and at uniformly spaced apart discrete areas. The elasticity of the material permits the stresses induced by freezing to be transferred to the material which is free to expand between the bonded areas. However, to provide such dimensional stability to the panel it must be supported on a bed over substantially its entire area so that it may be properly tilted to absorb maximum solar energy. In passive solar systems the storage tank and solar panel are usually mounted together, either tank-over-panel or back-to-back. Such a support bed is available at little extra cost in a back-to-back system, but may be at substantial added cost in a tank-over-panel arrangement. Further in some environments, the rubber may be subject to chemical attack over an extended period, such as ten to twenty years.

SUMMARY OF THE INVENTION

In accordance with the present invention, the foregoing difficulties are overcome by forming a solar panel of a pair of thin sheets bonded together around their peripheral edges and having formed in at least one of the sheets resiliently flexible areas defined by a plurality of abutting concave hexagonal areas or zones. The center of each hexagonal zone is formed as a dimple, concave with respect to the opposite sheet, whose radius of curvature is greater than the radius of a inscribed circle within said zone. The abutting zones between each hexagonal zone are formed convex relative to the opposite sheet and have a radius less than that of an inscribed circle. Preferably, where the hexagonal areas are relatively small as compared to panel dimensions, the sheets are joined together at the center of alternate spaced-apart hexagonal areas. In this way, except for the centers bonded near the panel edges, each joined hexagonal center is surrounded by six unjoined areas to form both transverse and longitudinal flow passages through the panel.

In a preferred form one plate may be substantially flat. However, if desired, both of the sheets or plates may be formed with complementary dimples.

Preferably, the centers of the hexagonal dimples are joined by rivets extending through both plates. Alternatively, one of the sheets may be perforated at such centers and the other plate deformed through the perforations.

By so forming the plates and securing them together at the spaced apart hexagonal zone centers, a low volume to surface area panel is formed which will adequately absorb the thermal stresses in the panel material as well as those imposed by repeated freeze and thaw cycles of the liquid. Further upon freezing, the solar water heating panel will quickly thaw upon absorption of solar energy and return the system to normal circulation by solar "pumping".

An embodiment of the present invention is a unitary solar water heating panel having a low total water volume and with sufficient flexibility to resist freeze destruction and to promote rapid thawing to restore circulation through the panel, the panel being formed of a pair of opposed substantially rectangular plate members bonded about their respective peripheral edges to enclose a volume therebetween, and a pair of conduit openings fromed in at least one of the plate members adjacent to the opposed edges of the panel for inlet and outlet of water to be heated therein, the surface of at least one of the plate members being uniformly dimpled with substantially hexagonally abutting zones, with the center of each hexagonal dimple being concave relative to the other of the plate members and formed with a radius of curvature greater than the diameter of a circle inscribed within the hexagonal area of the dimple, the abutting zones between adjacent dimples being convex and formed with a radius of curvature less than the radius of the inscribed circle, and the one plate member being mechanically joined to the other plate member at equally spaced apart centers of the hexagonal areas, except at the edge of the plate member, whereby expansion of water freezing in the enclosed volume of the panel is accommodated by flexure of the center areas of the dimples which are not joined together.

Another embodiment of the present invention is a solar water heating panel in accordance with the panel described hereinabove wherein the plate members are joined by perforations in one of the members and a portion of the other plate member is deformed through each of the perforations to form a seal therebetween.

Another embodiment of the present invention is a method of forming a unitary solar liquid heating panel having a low total water volume relative to solar surface area and with sufficient flexibility to resist thermal and freeze induced stresses therein, the panel being formed by bonding together a pair of opposed substantially rectangular plates about their respective peripheral edges to enclose a volume therebetween, forming in at least one of the plate members a pair of conduit openings adjacent to the opposed edges of the plates for inlet and outlet of liquid to be heated in the panel, the primary surface of at least one of the plate members having dimples formed therein as substantially hexagonal areas abutting each other, the center portion of each of the hexagonal areas being concave and having a radius of curvature greater than the diameter of an inscribed circle for the hexagonal area, the abutting zones of adjacent dimples being convex and formed with a radius of curvature less than the radius of the inscribed circle, and mechanically securing at least one plate member to the other plate member at the abutting concave center surfaces of at least three of the six dimples surrounding any dimple, at least three centers being equally spaced apart from each other, except near the edges of the panel, whereby expansion of water freezing in the enclosed volume of the panel is accommodated by flexure of the areas between secured center areas of the dimples.

Another embodiment of the present invention is a method of forming a solar liquid panel in accordance with the method described immediately hereinabove wherein the plate members are ductile metal and the plates are secured together by deformation of one of the sheets through a central opening in each of the secured dimples to form material-to-material bond, usually a metal-to-metal bond.

Another embodiment of the present invention is a method of forming a solar liquid panel in accordance with the method described herein wherein each center surface area is secured to the other plate member.

Yet another embodiment of the present invention is a unitary solar heating panel having a high ratio of surface area to total liquid volume to restore induced circulation after freezing, and having adequate flexibility to resist thermal stresses induced in the panel by freezing and thawing of the liquid, the panel being formed of a pair of opposed rectangular plate members bonded together about their respective peripheral edges to enclose a liquid volume therebetween, and a pair of conduit openings formed in at least one of the plate members adjacent to opposed edges of the members for inlet and outlet of water to be solar heated in the panel, the surface of at least one of the plate members being substantially uniformly dimpled with abutting hexagonal zones to form mutually intersecting concentric rings of hexagonal zones, each of the hexagonal zones having concentric rings of 6, 12 and 24 hexagonal zones thereabout, except at the edges of the plate member, the center of each hexagonal zone of at least one plate member being concave relative to the other the plate member, and formed with a radius of curvature greater than the diameter of an inscribed circle for the included hexagonal zone, the abutting zones of adjacent hexagonal zones being convex relative to the other plate and formed with a radius of curvature less than the radius of the inscribed circle, and at least one plate member being joined mechanically to the other plate at the center of three of the six surrounding hexagonal zones in the first concentric ring, whereby expansion of water freezing in the enclosed volume of the panel is accommodated by flexure of the centers of the dimples which are not joined together.

Further objects and advantages of the present invention will become apparent from the following detailed description of the preferred embodiments illustrated and described in connection with the accompanying drawings which form an integral part of the present specification.

BRIEF DESCRIPTION OF THE DRAWINGS

In the drawings:

FIG. 1 is a perspective view, partially in cross-section, of a solar water heating panel constructed in accordance with the present invention with a portion of the panel and mounting frame cut-away to show the low liquid volume to surface area ratio and the pattern for the joined hexagonal dimple zones.

FIG. 2 is an enlarged plan view of a portion of the surface of the solar panel of FIG. 1 constructed in accordance with the invention.

FIG. 3 is an elevational cross-sectional view of a portion of the solar heating panel of FIGS. 1 and 2, taken in the direction of arrows 3—3 in FIG. 2.

FIG. 4 is a cross-sectional elevation view through the panel of FIG. 2 taken in the direction of arrows 4—4, illustrating the curvature of the concave and convex portions of at least one of the sheets.

FIG. 5 is a partial elevational cross-section view through a connecting rivet at the center of one of the hexagonal dimple zones used to join the two sheets.

FIG. 6 is a view similar to FIG. 5 in which one of the sheets is perforated and the other sheet is deformed through a perforation to join the plates or sheets.

FIG. 7 is a cross-sectional elevation view similar to FIG. 4 in which both plates are formed with complementary hexagonal dimple areas or zones.

DESCRIPTION OF PREFERRED EMBODIMENTS

FIG. 1 shows a solar water heating panel 10 constructed in accordance with the present invention and positioned in an exposed location for maximum solar energy absorption. Such a location, of course, in cold weather, particularly at night, subjects the panel liquid to freezing conditions. Upon freezing the flow passageways through the panel are blocked and prevent circulation. Accordingly, it is desirable that circulation be reestablished as soon as possible when the panel again absorbs solar energy. For this reason, the surface area to liquid volume of panel 10 must be high. As shown, panel 10 is desirably formed of two generally rectangular sheets 12 and 14 which are bonded to each other around their peripheral edges. Solar water heating panel 10 is on the order of from 2 to 4 feet wide and 6 to 10 feet long for adequate solar absorption to heat a domestic water supply. The liquid may be water, but more frequently is a water solution or mixture, with anti-freeze liquids, such as alcohol, ethylene glycol and the like. Inlet and outlet connections such as 16 and 18 respectively are provided for admitting cold liquid at one end of panel 10 and for release of heated liquid from the other end. Support for panel 10 at the correct angle may be through lower pivots 11 and adjustable rods 13 at the upper end of panel support 20.

Because the liquid volume of panel 10 must be kept low for efficient "thermal" pumping of liquid, the thickness and bonding of sheets 12 and 14 is critical in domestic water service particularly for economical construction and long life, (10 to 20 years without replacement or repair). The quantity of material in each panel relates directly to initial cost, whether it is metal, such as copper, or glass fiber reinforced thermoset plastic. Further, it is cheaper to support panel 10 on a mounting base such as 20 in a tilted, raised position for proper angular exposure to the sun than to form the panel to support itself, particularly when filled with liquid. Hence, if the relatively thin sheets of material can withstand repeated freeze and thaw cycles for a prolonged period of time, such a panel is economical.

As discussed above, the arrangement of the surface of at least one of the sheets such as top sheet 14, provides such an economical arrangement. As better seen in FIGS. 2, 3, and 4, the surface of the sheet is formed to have a substantially uniform pattern of abutting hexagonal dimple areas or zones 17. These zones provide excellent heat absorption for outer surface 22 of sheet 14 and are resiliently deformable as by thermal expansion or contraction of sheet 14 or by ice formation in flow passageways 24 between sheets 12 and 14. Passageways 24 are free to withstand pressure stresses that may be applied by liquid freezing or near boiling therein by forming dimpled zones 17 as follows:

FIG. 4 indicates that the radius of an inscribed circle for each hexagonal area is R. Radius R accordingly defines the uniform areas of the abutting portions of each hexagonal area 17. To provide overall dimensional stability to sheet 14 the radius of the concave portion (relative to sheet 12) of area 17 is greater than R and the radius of the abutting areas forming passageways 24 is less than R. Such an undulating arrangement of alternate concave and convex surfaces in sheet 14 permits the sheet material to absorb stresses due to changes in liquid pressure or thermal expansion and contraction of the material over a range from about $-30°$ F. to $150°$ F. Such stresses are resisted by both bending forces substantially normal to the plane of sheet 14 and by membrane forces along the sheet.

To prevent "ballooning" of sheet 14 relative to flat plate 12, as illustrated in the arrangement of FIG. 4, or relative to a complementary hexagonally dimpled plate 25 as in FIG. 7, selected, evenly spaced apart dimpled zones are secured together. As best seen in FIGS. 1 and 2 the joined together dimpled areas 17 are at essentially equally spaced apart, alternate centers, except at the edges of the plate member, over substantially the full surface of sheet 12. The centers of dimples 17 are secured or joined to sheet 12, as by rivets 26 through perforations 30 and 28 respectively in sheets 12 and 14, as in FIGS. 4 and 5. Alternatively, a portion, such as 32, of the center of a dimple area 17 in sheet 14 may be deformed through perforation 30 in sheet 12, as in FIG. 6. FIG. 5 shows a single-headed rivet 36, similar to double-headed rivet 26, or deformed areas 32. The secured or joined alternate dimpled zones or areas 17 may be considered to be concentric about any one unsecured hexagonal zone. As so viewed, the six surrounding zones are unsecured and the second orbital ring of twelve zones includes six secured centers on alternate centers substantially 60° apart, (except as to edge positions). Still further to define such alternately secured or joined centers, (rivets 26) may be viewed as forming the meeting points of lines forming an equilateral triangle, as indicated by sides A, B and C in FIG. 2.

It will be apparent that the dimensions of hexagonal areas 17 relative to those of panel 10 may be widely varied depending upon the composition of plate 14, e.g. copper, stainless steel, thermoset plastic. Where the area dimples 17 is quite large, it may be desirable to secure the center of each such area to plate 12.

While only a few embodiments of the present invention have been described, various modifications and changes will occur to those skilled in the art without departing from the inventive concept of the present invention. All such modifications coming within the scope of the following claims are intended to be covered thereby.

I claim:

1. A unitary solar water heating panel having a low total water volume and with sufficient flexibility to resist freeze restruction and to promote rapid thawing to restore circulation through said panel, said panel being formed of a pair of opposed substantially rectangular plate members bonded about their respective peripheral edges to enclose a volume therebetween, and a pair of conduit openings formed in at least one of said plate members adjacent to opposed edges of said panel for inlet and outlet of water to be heated therein, the surface of at least one of said plate members, being uniformly dimpled with substantially hexagonally abutting zones, with the center of each hexagonal dimple begin concave relative to the other of said plate members and formed with a radius of curvature greater than the diameter of a circle inscribed within the hexagonal area of said dimple, said abutting zones between adjacent dimples being convex and formed with a radius of curvature less than the radius of said inscribed circle, and said one plate member being mechanically joined to the other plate member at equally spaced apart centers of said hexagonal areas, except near the edge of said plate member, whereby expansion of water freezing in said enclosed volume of said panel is accommodated by flexure of the center areas of said dimples which are not joined together.

2. A solar water heating panel in accordance with claim 1 wherein said other panel is a substantially flat plate.

3. A solar water heating panel in accordance with claim 1 wherein both of said panels include said dimples.

4. A solar water heating panel in accordance with claim 1 wherein said plate members are joined by rivets extending through to both plate members.

5. A solar water heating panel in accordance with claim 1 wherein said plate members are joined by perforations in one of said members and a portion of said other plate member is deformed through each of said perforations to form a seal therebetween.

6. A solar water heating panel in accordance with claim 1 wherein alternate centers of said hexagonal areas are joined to said other plate.

7. A solar water heating panel in accordance with claim 1 wherein each center of said hexagonal areas are joined to said other plate.

8. A method of forming a unitary solar liquid heating panel having a low total water volume relative to solar surface area and with sufficient flexibility to resist thermal and freeze induced stresses therein, said panel being formed by bonding together a pair of opposed substantially rectangular plates about their respective peripheral edges to enclosed a volume therebetween, forming a pair of conduit openings in at least one of said plate members adjacent to opposed edges of said plates for inlet and outlet of liquid to be heated in said panel, the primary surface of at least one of said plate members having dimples formed therein as substantially hexagonal areas abutting each other, the center portion of each of said hexagonal areas being concave and having a radius of curvature greater than the diameter of an inscribed circle for said hexagonal area, the abutting zones of adjacent dimples being convex and formed with a radius of curvature less than the radius of said inscribed circle, and securing mechanically said at least one plate member to the other plate member, at the abutting concave center surfaces of at least three of the six dimples surrounding any dimple, said at least three centers being equally spaced apart from each other, except at the edge of said plate member, whereby expansion of water freezing in said enclosed volume of said panel is accommodated by flexure of the areas between secured center areas of said dimples.

9. Method of forming a solar liquid panel in accordance with claim 8 wherein one of said plates is substantially flat.

10. Method of forming a solar liquid panel in accordance with claim 8 wherein both plates are formed with dimples.

11. Method of forming a solar liquid panel in accordance with claim 8 wherein said joining is by rivets extending through the centers of said dimples in said one plate.

12. Method of forming a solar liquid panel in accordance with claim 8 wherein said plate members are ductile metal and said plates are secured together by deformation of one of said sheets through a central opening in each of said secured dimples.

13. Method of forming a solar liquid panel in accordance with claim 8 wherein each center surface area is secured to said other plate member.

14. A unitary solar heating panel having a high ratio of surface area to total liquid volume to restore induced circulation after freezing, and having adequate flexibility to resist thermal stresses induced in said panel by freezing and thawing of said liquid, said panel being formed of a pair of opposed rectangular plate members bonded together about their respective peripheral edges to enclose a liquid volume therebetween, and a pair of conduit openings formed in at least one of said plate members adjacent to opposed edges of said members for inlet and outlet of water to be solar heated in said panel, the surface of at least one of said plate members being substantially uniformly dimpled with abutting hexagonal zones to form mutually intersecting concentric rings of hexagonal zones, each of said hexagonal zones having concentric rings of 6, 12 and 24 hexagonal zones thereabout, except at the edges of said plate member, the center of each hexagonal zone of said at least one plate member being concave relative to the other said plate member, and formed with a radius of curvature greater than the diameter of an inscribed circle for the included hexagonal zone, said abutting zones of adjacent hexagonal zones being convex relative to said other plate and formed with a radius of curvature less than the radius of said inscribed circle, and said at least one plate member being joined mechanically to the other plate at the center of three of the six surrounding hexagonal zones in the first concentric ring, whereby expansion of water freezing in said enclosed volume of said panel is accommodated by flexure of the centers of said dimples which are not joined together.

* * * * *